United States Patent
He et al.

(10) Patent No.: US 7,299,154 B1
(45) Date of Patent: Nov. 20, 2007

(54) METHOD AND APPARATUS FOR FAST DISTURBANCE DETECTION AND CLASSIFICATION

(75) Inventors: Qinghua He, Austin, TX (US); Jin Wang, Austin, TX (US); Christopher A. Bode, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 11/130,459

(22) Filed: May 16, 2005

(51) Int. Cl.
*G06F 17/18* (2006.01)
(52) U.S. Cl. ............... 702/181; 702/182; 702/185
(58) Field of Classification Search ........... 702/179, 702/180, 181–182, 81, 83, 185; 700/108–110, 700/112, 117, 121, 129, 100; 438/5, 6, 14, 438/17, 18; 324/754, 765
See application file for complete search history.

(56) References Cited

U.S. PATENT DOCUMENTS

| | | | | |
|---|---|---|---|---|
| 5,886,906 | A * | 3/1999 | Tatsumi et al. | 703/14 |
| 6,466,895 | B1 * | 10/2002 | Harvey et al. | 702/181 |
| 6,563,300 | B1 * | 5/2003 | Jackson et al. | 324/158.1 |
| 6,890,773 | B1 * | 5/2005 | Stewart | 438/14 |
| 6,988,017 | B2 * | 1/2006 | Pasadyn et al. | 700/121 |
| 2005/0171626 | A1 * | 8/2005 | Schwarm | 700/108 |

* cited by examiner

*Primary Examiner*—Bryan Bui
(74) *Attorney, Agent, or Firm*—Williams, Morgan & Amerson

(57) ABSTRACT

The present invention provides a method and apparatus for detecting step and impulse disturbances. The method includes determining a pattern based on a plurality of probabilities associated with a corresponding plurality of wafer processing parameters and determining a type of a disturbance based upon the pattern.

25 Claims, 8 Drawing Sheets

METHOD AND APPARATUS FOR FAST DISTURBANCE DETECTION AND CLASSIFICATION

BACKGROUND OF THE INVENTION

1. Field of the Invention

This invention relates generally to semiconductor processing, and, more particularly, to detecting disturbances and determining disturbance types during semiconductor processing.

2. Description of the Related Art

Statistical process control (SPC) is commonly used to monitor semiconductor processing tools based on measurements of parameters associated with features formed by the processing tools. For example, an etching process may be monitored by measuring depths of features formed on each semiconductor wafer in a lot of etched wafers. The parameters may be plotted on a statistical process control chart, e.g., as a function of processing lot or run. For example, the statistical process control chart may be formed by plotting the actual measured depths for features formed on a plurality of wafers. In some cases, operating recipes used for the processing tools may be modified during a processing run. The modifications may result in changes to the parameters of the features formed using the processes, such as a depth of an etched feature. Accordingly, a generalized statistical process control chart may plot values of the measured depths that are corrected for the expected changes in the parameters.

Although a certain amount of random variation in the parameters is expected, deviations of one or more parameters from a target value may indicate undesirable and/or unexpected operation of the processing tool. Accordingly, the statistical process control chart (or the generalized statistical process control chart) may be examined for outlier points that deviate from a target value by an amount that is larger than expected for normal random variations of the associated parameter. For example, the statistical process control chart may be visually inspected by an engineer for outlier points. Alternatively, the statistical process control chart may be analyzed using statistical techniques. For example, an outlier point may be used as an indication that a disturbance has occurred in the processing. Accordingly, the outlier point may be used as a trigger for further analysis and determination of corresponding actions that may be used to address the issue.

Conventional algorithms for analyzing the statistical process chart calculate a posteriori, i.e., after the fact, probability that the value of the outlier point indicates a step and/or impulse disturbance in the processing. However, the posteriori probability associated with the outlier point rarely, if ever, contains enough information to discriminate between a step disturbance and an impulse disturbance. Accordingly, conventional algorithms may select a second point associated with a feature formed after the feature associated with the outlier point and calculate a posteriori probability that the value of the second point indicates a step and/or impulse disturbance in the processing. If the posteriori probability associated with second point does not contain enough information to discriminate between a step disturbance and an impulse disturbance, another point may be selected and analyzed. This point-by-point process continues until the posteriori probability associated with one of the points increases above a predetermined threshold. In addition to the aforementioned requirement of an outlier detection algorithm (for example, a generalized SPC chart) to trigger the analysis, conventional algorithms for detecting step and/or impulse disturbances typically require a delay of 4 to 5 lots before the posteriori probability can discriminate between a step disturbance and an impulse disturbance.

The amplitude of the deviation in the outlier point required to trigger conventional disturbance detection algorithms for analyzing the statistical process chart is typically large enough to trigger an alarm condition in the associated processing tool. Consequently, the conventional disturbance detection algorithm may miss some early warning signals until they become severe enough to trigger the SPC alarm. Accordingly, conventional disturbance detection algorithms may be inappropriate for closed-loop control of the processing tool because closed-loop control algorithms reduce variations in the measured parameters and thus the alarm condition will not be triggered in most cases.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, an apparatus is provided for detecting a disturbance and determining the disturbance type. The apparatus includes at least one processing tool for processing wafers, at least one measurement tool for measuring wafer processing parameters, and a disturbance analysis unit. The disturbance analysis unit is configured to determine a pattern based on a plurality of probabilities associated with a corresponding plurality of wafer processing parameters and determine a type of a disturbance based upon the pattern.

In another embodiment of the present invention, a method is provided for detecting a disturbance and determining the disturbance type. The method includes determining a pattern based on a plurality of probabilities associated with a corresponding plurality of wafer processing parameters and determining a type of a disturbance based upon the pattern.

BRIEF DESCRIPTION OF THE DRAWINGS

The invention may be understood by reference to the following description taken in conjunction with the accompanying drawings, in which like reference numerals identify like elements, and in which.

Figure 1:
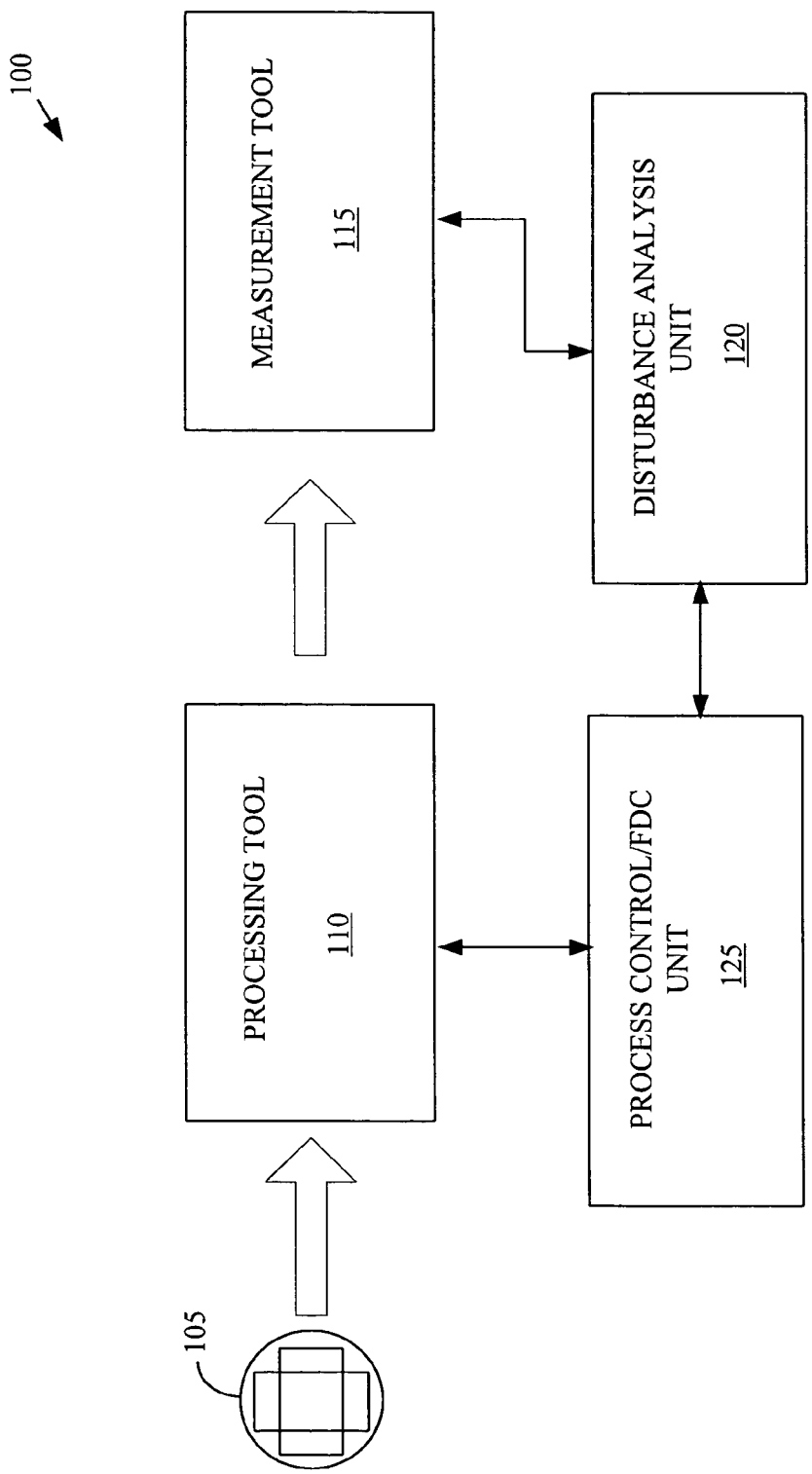
FIG. 1 conceptually illustrates one exemplary embodiment of a system for fabricating one or more wafers, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a system 100 for fabricating one or more wafers 105. Although a single wafer 105 is shown in FIG. 1, persons of ordinary skill in the art should appreciate that the wafer 105 may be representative of a single wafer 105, a plurality of wafers 105, a wafer lot, and/or a plurality of wafer lots. Furthermore, the wafer 105 may be substantially unprocessed or may have been previously processed. In the illustrated embodiment, the wafer 105 may be provided to a processing tool 110. Exemplary processing tools include, but are not limited to, deposition tools, lithography tools, etching tools, ion implantation tools, and polishing tools. The processing tool 110 may be a standalone tool configured to perform a single processing task, such as deposition, lithography, etching, plant implantation, or polishing, or it may be an integrated tool that is configured to perform multiple processing tasks. For example, the processing tool 110 may include a plurality of chambers for performing a plurality of processing tasks.

The illustrated embodiment of the system 100 also includes a measurement tool 115. Exemplary measurement tools 115 include, but are not limited to, metrology tools (such as scatterometers and ellipsometers) and wafer electrical test tools. The measurement tool 115 may be a standalone tool or an integrated tool. Moreover, in some embodiments, the measurement tool 115 may be integrated with the processing tool 110. The wafer 105 may be provided to the measurement tool 115 before, during, and/or after processing by the processing tool 110. The measurement tool 115 may measure one or more parameters associated with processing of the wafer 105 by the processing tool 110, as well as any other processing that may have been performed on the wafer 105. For example, the measurement tool 115 may include a metrology tool for measuring physical parameters of features formed on the wafer 105, such as layer thicknesses, profiles and/or critical dimensions of features formed on the wafer 105, depths of vias and/or trenches formed on the wafer 105, and the like. For another example, the measurement tool 115 may include a wafer electrical test tool for measuring electrical parameters of features formed on the wafer, such as voltages, currents, and the like.

A disturbance analysis unit 120 is communicatively coupled to the measurement tool 115. The disturbance analysis unit 120 may access values of one or more of the parameters associated with the wafer 105 and use these values to detect a disturbance in the processing performed by the processing tool 110, as well as any other processing performed on the wafer 105. In one embodiment, the disturbance may be detected by assuming that a disturbance occurs at every run, and then the disturbance analysis unit 120 confirms or rejects the hypothesis based on an analysis of a posteriori probability sequence. When the hypothesis is confirmed, i.e., a disturbance has occurred, the disturbance analysis unit 120 determines the type of the disturbance by matching the pattern of the posterior probability to the pattern of the posteriori probability corresponding to a type of disturbance, such as a step disturbance, an impulse disturbance, and the like, as will be discussed in detail below. Persons of ordinary skill in the art should appreciate that the disturbance analysis unit 120 may be implemented in hardware, software, or any combination thereof.

In one embodiment, the disturbance analysis unit 120 is also communicatively coupled to a process control and fault detection/classification (FDC) system 125. The disturbance analysis unit 120 may therefore provide information to the process control and fault detection/classification system 125 based upon the analysis of the parameter values, the probabilities, and/or the pattern of probabilities discussed above. The disturbance analysis unit 120 may provide disturbance information that may be used by the process control and fault detection/classification system 125 to modify an operating recipe used by the processing tool 110. Alternatively, the disturbance analysis unit 120 may feed-forward information that may be used by other processing tools (not shown). For example, the information may be used in step tracking, impulse rejection, or other operations.

Figure 2A:
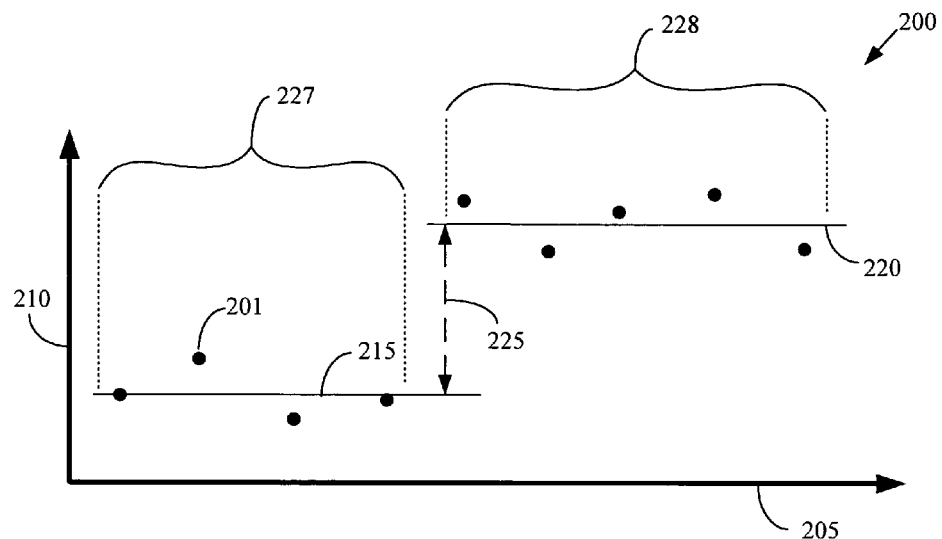
FIG. 2A shows a first exemplary embodiment of a time series process chart, in accordance with the present invention.

FIG. 2A shows a first exemplary embodiment of a time series process chart 200. In the illustrated embodiment, values 201 (only one labeled in FIG. 2A) of a parameter associated with a plurality of wafer lots are plotted as a function of lot number. As discussed above, the parameters may be physical parameters or electrical parameters associated with the wafer lots. However, persons of ordinary skill in the art should appreciate that the parameter is not limited to individual parameters that may be measured. In alternative embodiments, composite and/or derived parameters may be formed based upon one or more of the measured parameters or combinations of the measured parameters. The lot number is plotted along horizontal axis 205 and increases to the right. The value of the parameter is plotted along vertical axis 210 and increases upward. Units of the axes 205, 210 are arbitrary.

Line 215 indicates a target value for the parameters 201. The first four parameter values 201 (moving left to right) are approximately randomly distributed around the target value 215. However, later parameter values 201 are approximately randomly distributed around a target value 220 that differs from the target value 215 by an amount indicated by arrow 225. This type of disturbance in the parameter values 201 is commonly referred to as a "step disturbance." Although the disturbance 225 is positive in the illustrated embodiment, the present invention is not limited to increases in the target values 215, 220. In alternative embodiments, the disturbance 225 may be positive or negative. Furthermore, the target values 215, 220 may not be constant. For example, the target values 215, 220 may vary as a function of lot number if a time series of composite and/or derived parameters are plotted.

In the illustrated embodiment, the parameter values 201 are grouped into a pre-disturbance group 227 and a post-disturbance group 228. The pre-disturbance group 227 includes parameter values 201 for lot numbers processed prior to the disturbance 225 and the post-disturbance group 228 includes parameter values 201 for lot numbers processed substantially during or after the disturbance indicated by the arrow 225. For example, a fault may occur in a processing tool while processing wafers in one of the lots, in which case this lot number and subsequent lot numbers may be included in the post-disturbance group 228.

Figure 2B:
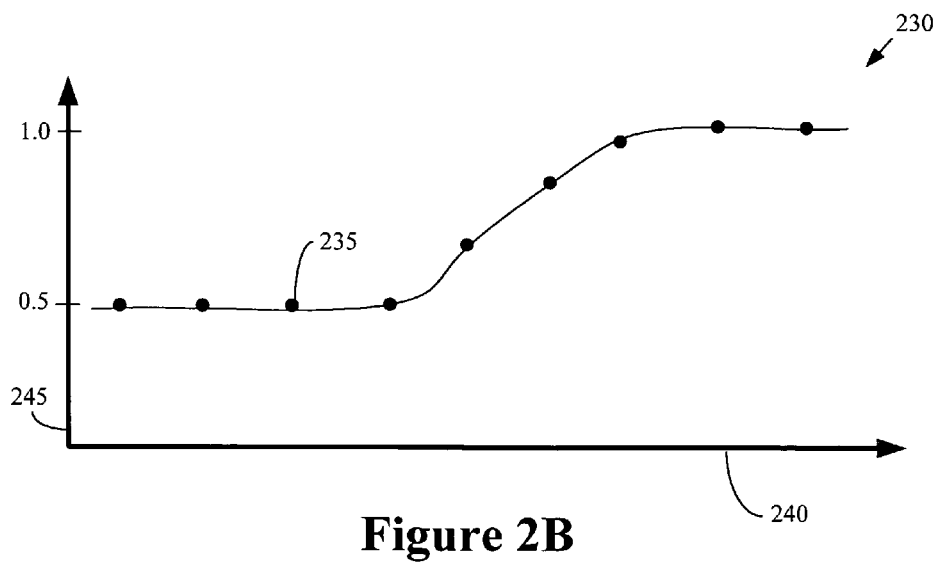
FIG. 2B conceptually illustrates a first exemplary embodiment of a plot of a plurality of probabilities, in accordance with the present invention.

FIG. 2B conceptually illustrates a first exemplary embodiment of a plot 230 of a plurality of probabilities 235 (only one labeled in FIG. 2B). In the illustrated embodiment, the probabilities 235 represent a probability that a corresponding parameter value 201 indicates that a step disturbance has occurred. Although posteriori probabilities may be used, persons of ordinary skill in the art should appreciate that the probabilities 235 are not limited to posteriori probabilities indicative of a step disturbance. In alternative embodiments, the probabilities 235 may represent probabilities associated with other types of disturbances. The lot number is plotted along horizontal axis 240 and increases to the right. The value of the posteriori probability 235 is plotted along vertical axis 245 and increases upward.

The probabilities 235 associated with parameter values 201 for lot numbers in the pre-disturbance group 227 are prior probabilities, each of which represents the probability that a step disturbance occurred based on information associated with the parameter values 201 in the pre-disturbance group 227. In this illustrative example, the prior probability is approximately equal to 0.5, indicating that without any further information, there are roughly equal probabilities that a step disturbance did or did not occur to the current parameter value 201. The probability 235 associated with parameter values 201 in the post-disturbance group 228 are posteriori probabilities, which are calculated by incorporating the parameter values 201 in post-disturbance group 228. In this illustrative example, the posteriori probability increases with increasing lot number until the posteriori probability rises to approximately 1.0, indicating a very strong probability that a step disturbance did occur.

Figure 3A:
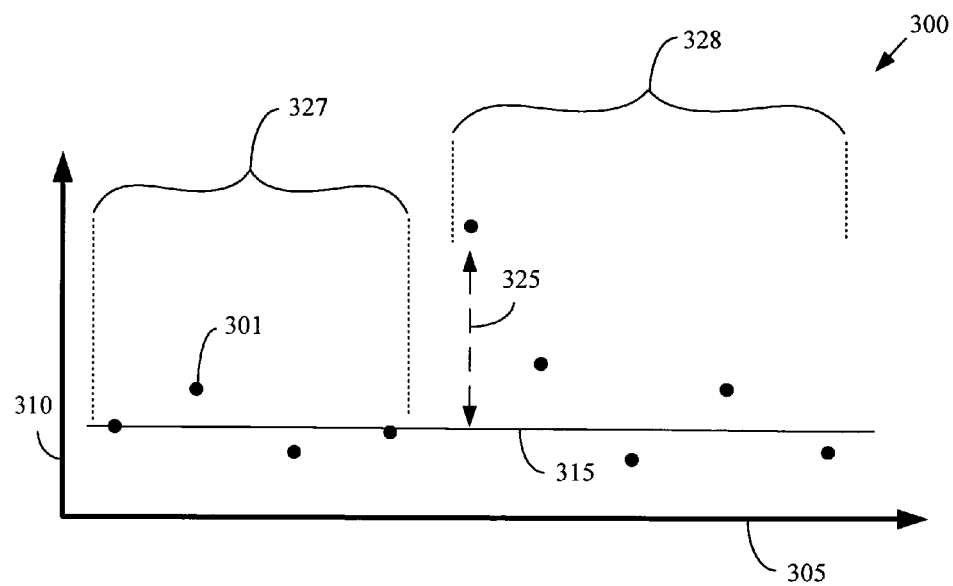
FIG. 3A shows a second exemplary embodiment of a time series process chart, in accordance with the present invention.

FIG. 3A shows a second exemplary embodiment of a time series process chart 300. In the illustrated embodiment, values 301 (only one labeled in FIG. 3A) of a parameter associated with a plurality of wafer lots are plotted as a function of lot number. As discussed above, the parameters may be physical parameters, electrical parameters, parameters formed based upon the measured parameters or combinations of the measured parameters, and the like. The lot number is plotted along horizontal axis 305 and increases to the right. The value of the parameter is plotted along vertical axis 310 and increases upward. Units of the axes 305, 310 are arbitrary.

Line 315 indicates a target value for the parameters 301. The first four parameter values 301 (moving from left to right) are approximately randomly distributed around the target value 315. However, the fifth parameter value 301 deviates from the target value 315 by an amount indicated by the arrow 325. Subsequent parameter values 301 again appear to be approximately randomly distributed around the target value 315. This type of disturbance in the parameter values 301 is commonly referred to as an "impulse disturbance." Although the impulse disturbance 325 is positive in the illustrated embodiment, the present invention is not limited to positive impulse disturbances 325. In alternative embodiments, the impulse disturbances 325 may be positive or negative. Furthermore, the target value 315 may not be constant. For example, the target value 315 may vary as a function of lot number if the time series process chart 300 is a generalized time series process chart.

In the illustrated embodiment, the parameter values 301 are grouped into a pre-disturbance group 327 and a post-disturbance group 328. The pre-disturbance group 327 includes parameter values 301 for lot numbers processed prior to the impulse disturbance indicated by the arrow 325 and the post-disturbance group 328 includes parameter values 301 for lot numbers processed substantially during or after the impulse disturbance 325, as discussed above.

Figure 3B:
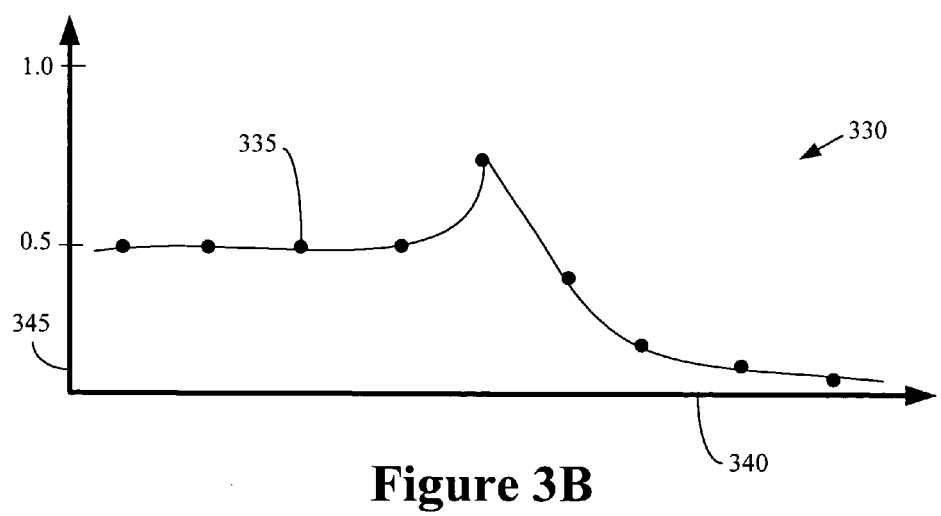
FIG. 3B conceptually illustrates a second exemplary embodiment of a plot of a plurality of probabilities, in accordance with the present invention.

FIG. 3B conceptually illustrates a second exemplary embodiment of a plot 330 of a plurality of probabilities 335 (only one labeled in FIG. 3B). In the illustrated embodiment, the probabilities 335 represent a probability that a corresponding parameter value 301 indicates that a step disturbance has occurred. However, persons of ordinary skill in the art should appreciate that the probabilities 335 are not limited to probabilities indicative of a step disturbance. In alternative embodiments, the probabilities 335 may represent probabilities associated with other types of disturbances, such as the impulse disturbance 325. The lot number is plotted along horizontal axis 340 and increases to the right. The value of the probability 335 is plotted along vertical axis 345 and increases upward.

The prior probabilities 335 associated with parameter values 301 for lot numbers in the pre-disturbance group 327 are approximately equal to 0.5, indicating a roughly equal probability that the parameter value 301 indicates that a step disturbance did or did not occur. The posteriori probability 335 associated with parameter values 301 in the post-disturbance group 328 increases with increasing lot number for the first post-disturbance parameter value 301, but then the posteriori probability drops to approximately 0.0, indicating a very strong probability that an impulse disturbance occurred.

Figure 4:
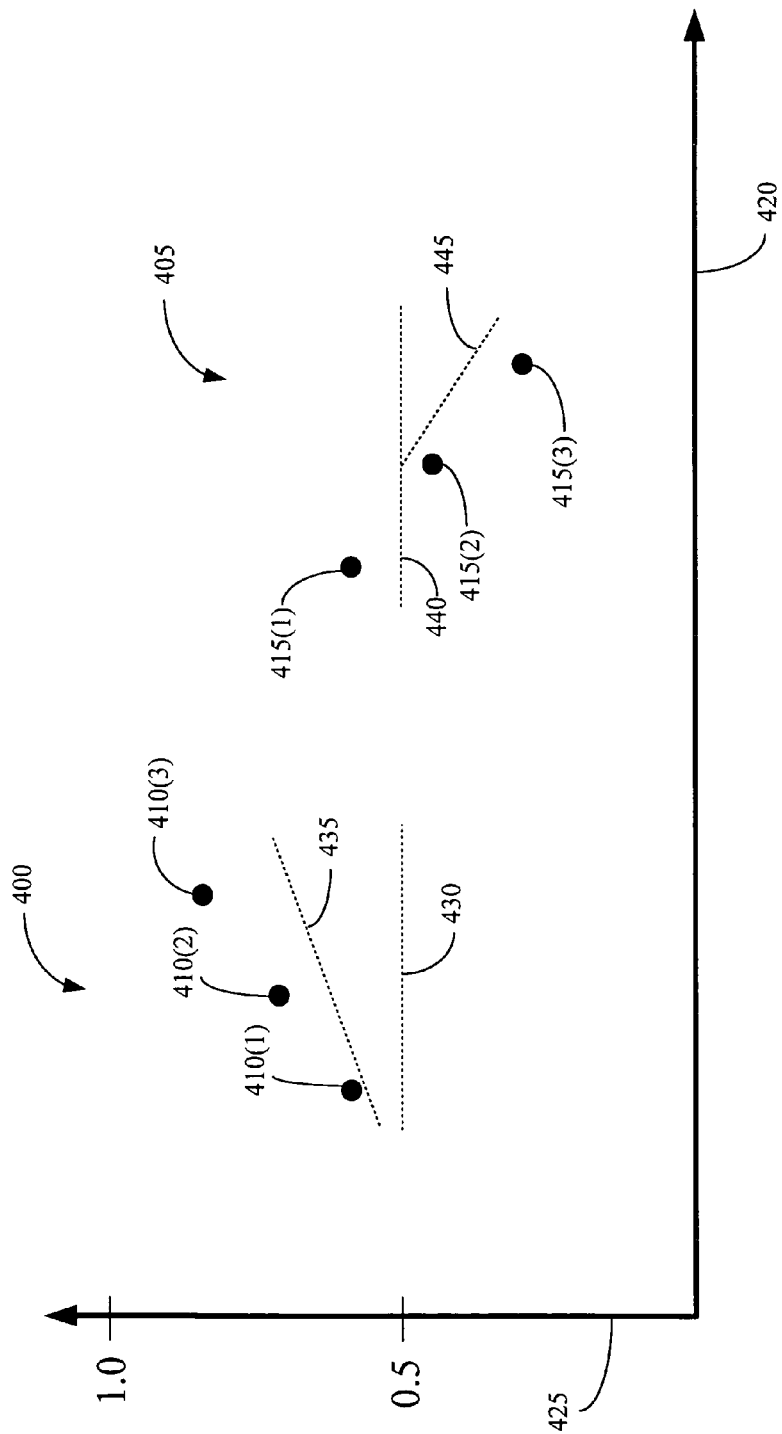
FIG. 4 conceptually illustrates first and second exemplary embodiments of patterns of probabilities, in accordance with the present invention.

FIG. 4 conceptually illustrates first and second exemplary embodiments of patterns 400, 405 of probabilities 410(1-3), 415(1-3). In the illustrated embodiment, each of the probabilities 410(1-3), 415(1-3) represents a posteriori probability that a step disturbance has occurred, as discussed above. The patterns 400, 405 may be formed using probabilities 410(1-3), 415(1-3) associated with parameter values selected from a post-disturbance window, such as the post-disturbance windows 228, 328, shown in FIGS. 2B and 3B. The lot number is plotted along horizontal axis 420 and increases to the right. The value of the posteriori probability is plotted along vertical axis 425 and increases upward.

The first exemplary embodiment of the pattern 400 shows three probabilities 410(1-3) that generally increase with increasing run (or lot) number. The pattern 400 may be indicative of a step disturbance, as may be seen by comparing the pattern 400 to the probability plot 230 shown in FIG. 2B. Accordingly, the pattern 400 may be used to determine that a step disturbance has occurred. In one embodiment, a disturbance may be detected by determining that the probability 410(1) exceeds a threshold 430, e.g., the probability 410(1) may be used as a trigger for a statistical analysis of the probabilities 410(1-3). The disturbance may then be identified as a step disturbance by comparing the pattern 400 to a target pattern and/or threshold. In one embodiment, the probabilities 410(1-3) are compared to the threshold 430 and the disturbance is identified as a step disturbance if all of the probabilities 410(1-3) exceed the threshold value 430. Alternatively, the probabilities 410(1-3) may be compared to a target pattern 435. For example, the disturbance may be identified as a step disturbance if the probabilities 410(1-3) are equal to or exceed the corresponding values of the target pattern 435. Persons of ordinary skill in the art should appreciate that the statistical analysis described above is intended to be illustrative and not to limit the present invention. In alternative embodiments, other techniques for analyzing the pattern 400 to determine a type of the disturbance may be used.

The second exemplary embodiment of the pattern 405 shows three probabilities 415(1-3) that generally decrease with increasing run number. The pattern 405 may be indicative of an impulse disturbance, as may be seen by comparing the pattern 405 to the probability plot 330 shown in FIG. 3B. Accordingly, the pattern 405 may be used to determine that an impulse disturbance has occurred. In one embodiment, a disturbance may be detected by determining that the probability 415(1) exceeds a threshold 440, e.g., the probability 415(1) may be used as a trigger for a statistical analysis of the probabilities 415(1-3). The disturbance may be identified as an impulse disturbance by comparing the pattern 405 to a target pattern and/or threshold. In one embodiment, the probabilities 415(1-3) are compared to the threshold 440 and the disturbance is identified as an impulse disturbance if the probability 415(1) exceeds the threshold value 440, but the probabilities 415(2-3) fall below the threshold value 440. Alternatively, the probabilities 415(1-3) may be compared to a target pattern 445. For example, the disturbance may be identified as an impulse disturbance if the probability 415(1) exceeds the threshold value 440, but the probabilities 415(2-3) fall below the values of the target pattern 445. Persons of ordinary skill in the art should appreciate that the statistical analysis described above is intended to be illustrative and not to limit the present invention. In alternative embodiments, other techniques for analyzing the pattern 405 to determine a type of the disturbance may be used.

Figure 5:
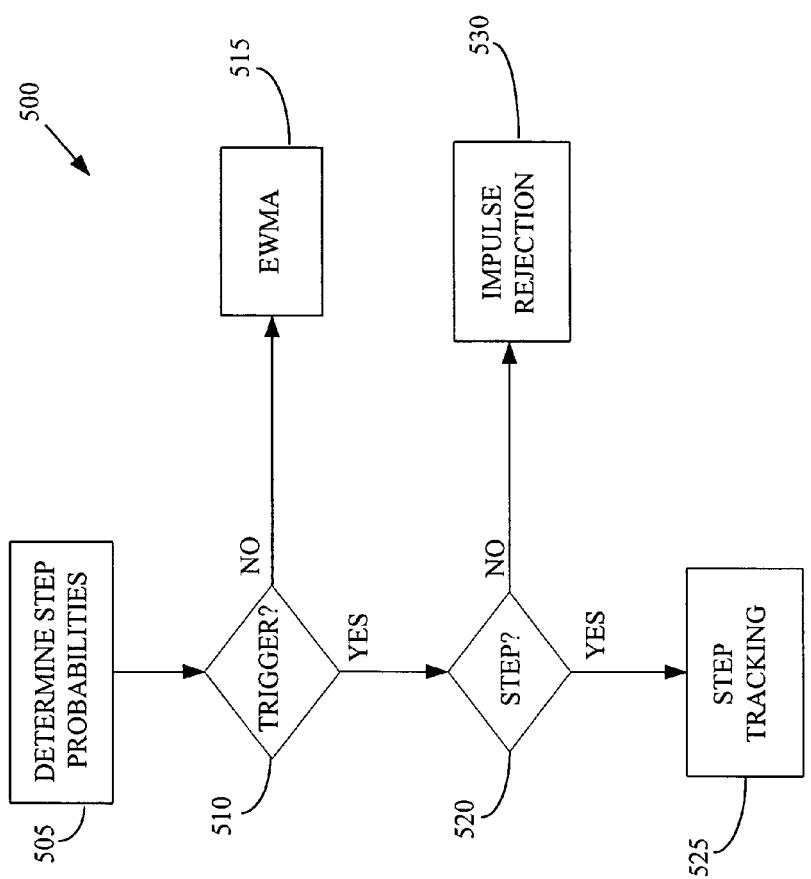
FIG. 5 conceptually illustrates one exemplary embodiment of a method for determining a type of a disturbance, in accordance with the present invention.

FIG. 5 conceptually illustrates one exemplary embodiment of a method 500 for detecting and classifying a disturbance. In the illustrated embodiment, a plurality of probabilities associated with a corresponding plurality of wafer processing parameters is determined (at 505). For example, the probabilities may be indicative of a step disturbance, as discussed above. If none of the probabilities indicates that a disturbance has occurred, then no disturbance analysis is triggered (at 510) and data associated with the wafer processing parameters may be provided to, and processed by, an exponentially weighted moving average (EWMA) filter. If at least one of the probabilities indicates that a disturbance has occurred, this probability may be used to trigger (at 510) an analysis of the posteriori probabilities.

The type of the disturbance may be determined (at 520) based on a pattern formed with the plurality of probabilities. The pattern may then be compared to a threshold and/or a target pattern, as discussed in detail above. If the pattern is determined (at 520) to be indicative of a step disturbance, then a step tracking algorithm may be invoked (at 525). Step tracking algorithms are known to persons of ordinary skill in the art and so will not be discussed further herein. If the pattern is determined (at 520) to be indicative of an impulse disturbance, then an impulse rejection algorithm may be invoked (at 530). Impulse rejection algorithms are known to persons of ordinary skill in the art and so will not be discussed further herein.

The method 500 may have a number of advantages over conventional practice. For example, the method 500 does not require an SPC chart to detect the onset of the disturbance. Thus, the method 500 may be implemented in processes that are not equipped with the SPC charts. Moreover, the amplitude of deviations in outlier points required to trigger an analysis such as may be implemented in the method 500 may be much smaller that the deviation that could trigger an alarm condition in a processing tool. Accordingly, the method 500 may be suitable for implementation in closed-loop control algorithms and variations in the measured parameters may be reduced to values substantially smaller than the deviations in the measured parameters that would trigger an alarm condition.

Figure 6:
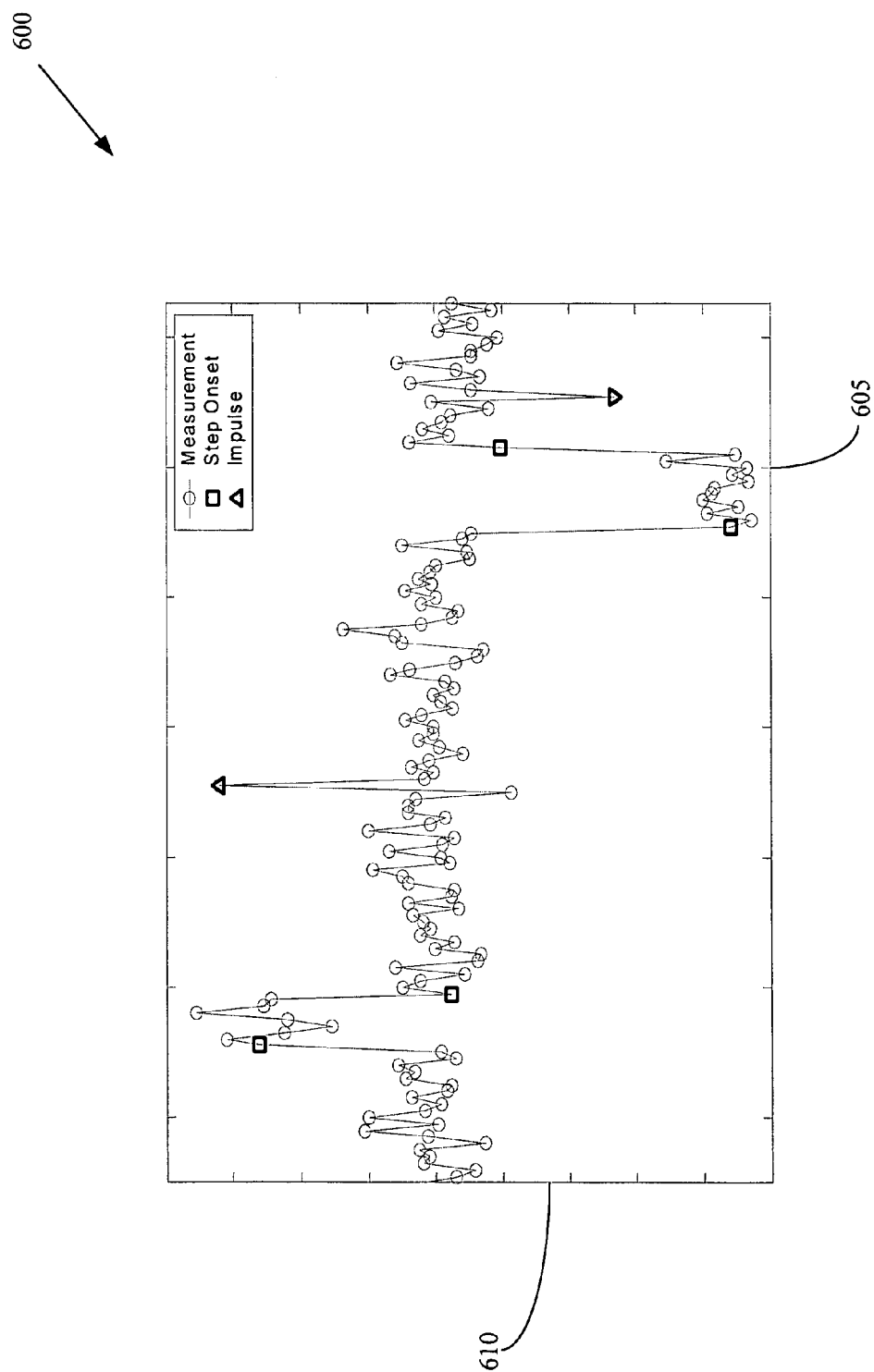
FIG. 6 shows a third exemplary embodiment of a time series process chart, in accordance with the present invention.

FIG. 6 shows a third exemplary embodiment of a time series process chart 600. A lot number is plotted along horizontal axis 605 and increases to the right. The value of a parameter associated with processing of wafers in each lot is plotted along vertical axis 610 and increases upward. Units of the parameter and the vertical axis 610 are arbitrary. In the illustrated embodiment, a step onset (indicated by a square) or an impulse onset (indicated by a triangle) is detected and classified after only 2-3 lots once a disturbance has occurred. For example, the delay in detecting the step onset may be approximately equal to the number of lots in a post-disturbance window. Conventional techniques for analyzing the time series process chart 600 typically require at least four to five lots to determine whether the disturbance is a step disturbance or not once SPC chart detects the disturbance.

Figure 7:
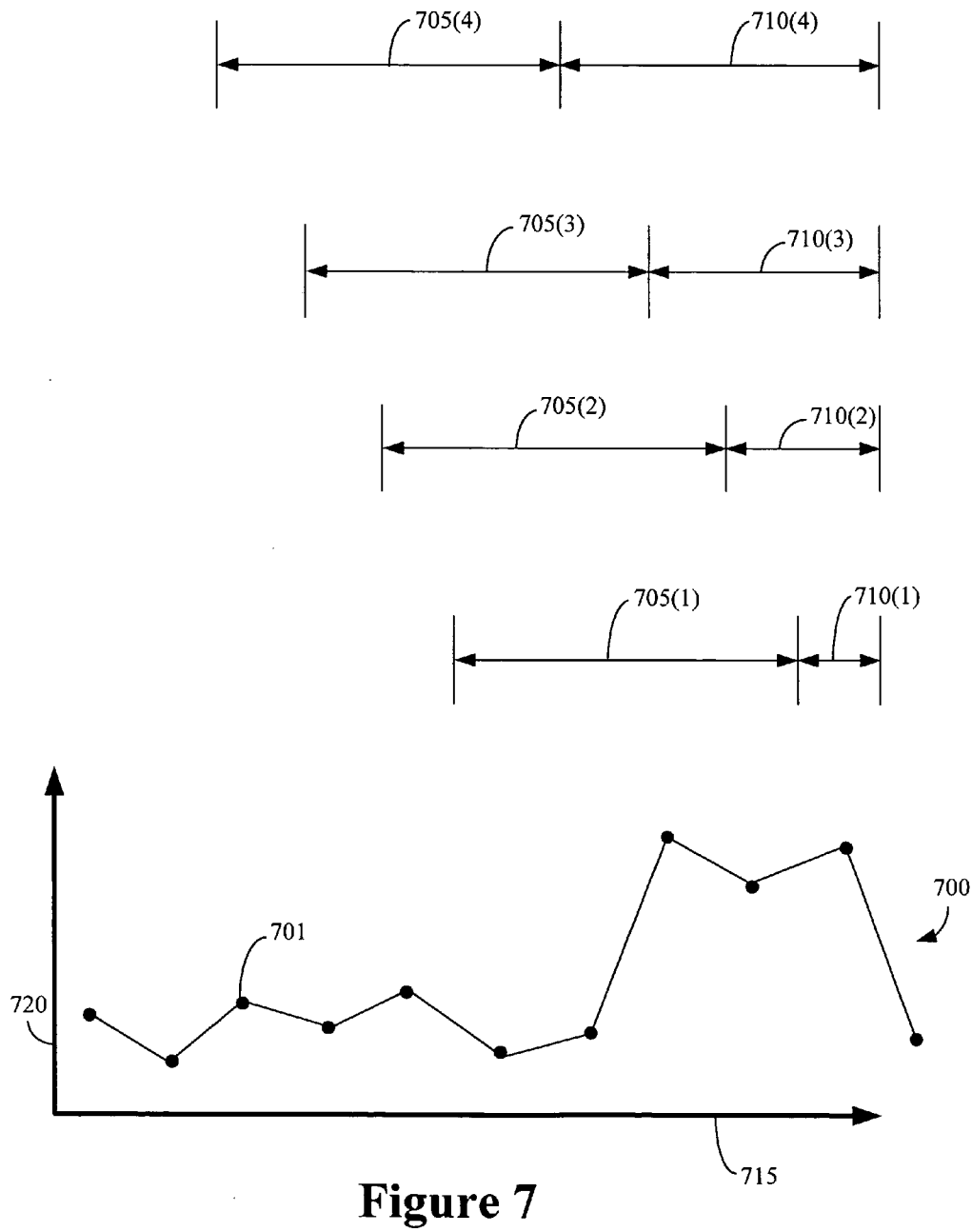
FIG. 7 conceptually illustrates a time series process chart and a plurality of pre-disturbance windows and post-disturbance windows, in accordance with the present invention.

FIG. 7 conceptually illustrates a time series process chart 700 and a plurality of pre-disturbance windows 705(1-4) and post-disturbance windows 710(1-4). In the illustrated embodiment, values 701 (only one indicated in FIG. 7) of a parameter associated with a plurality of wafer lots are plotted as a function of lot number. As discussed above, the parameters may be physical parameters, electrical parameters, parameters formed based upon the measured parameters or combinations of the measured parameters, and the like. The lot number is plotted along horizontal axis 715 and increases to the right. The value of the parameter is plotted along vertical axis 720 and increases upward. Units of the axes 715, 720 are arbitrary.

The post-disturbance windows 710(1-4) may have different lengths so that they encompass parameter values associated with different ranges of lot number. Persons of ordinary skill in the art should appreciate that the particular ranges of lot numbers associated with the post-disturbance windows 710(1-4) are intended to be illustrative and not to limit the present invention. Furthermore, persons of ordinary skill in the art should also appreciate that the pre-disturbance windows 705(1-4) may also have variable lengths.

The patterns formed using the probabilities associated with parameter values (or lot numbers) in the different post-disturbance windows 710(1-4) may be used to detect and classify different types of disturbances. For example, probabilities associated with parameter values in the post-disturbance window 710(1), which includes two lot numbers, may be used to detect impulse disturbances. For another example, probabilities associated with parameter values in the post-disturbance window 710(2), which includes three lot numbers, may be used to detect step disturbances that last for approximately two lots. For yet another example, probabilities associated with parameter values in the post-disturbance window 710(3), which includes four lot numbers, may be used to detect step disturbances that last for approximately three lots, such as the step disturbance shown in the time series process chart 700. For yet another example, probabilities associated with parameter values in the post-disturbance window 710(4), which includes five lot numbers, may be used to detect step disturbances that last for approximately four lots.

Figure 8:
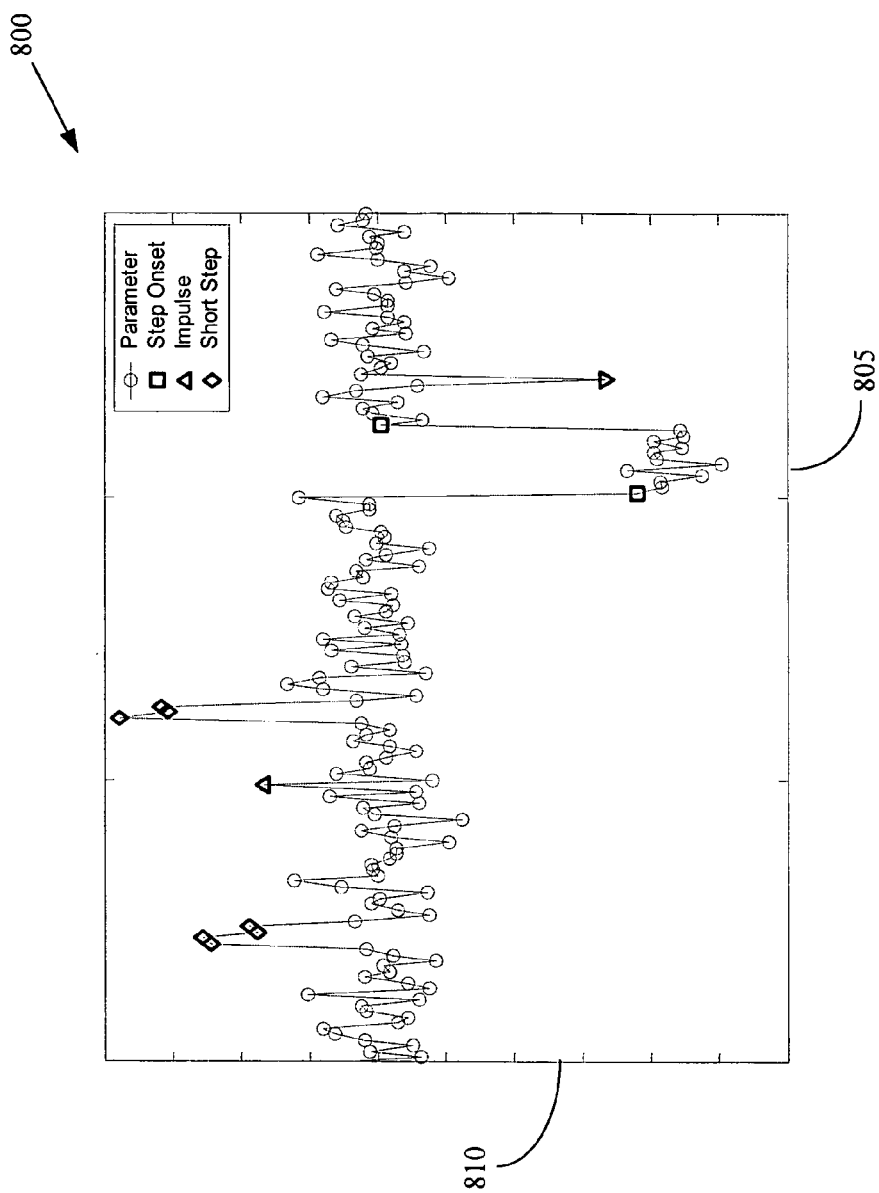
FIG. 8 shows a fourth exemplary embodiment of a time series process chart, in accordance with the present invention.

FIG. 8 shows a fourth exemplary embodiment of a time series process chart 800. A lot number is plotted along horizontal axis 805 and increases to the right. The value of a parameter associated with processing of wafers in each lot is plotted along vertical axis 810 and increases upward. Units of the parameter and the vertical axis 810 are arbitrary. In the illustrated embodiment, a disturbance onset is detected with at most 2 runs delay, and the type of disturbance is classified without delay (i.e., only one inherent delay). For example, the onset of a step disturbance (indicated by a square) is detected 2 runs later after the disturbance occurs and the onset of an impulse disturbance (indicated by a triangle) is detected 1 run after the disturbance occurs. For another example, an impulse disturbance would be classified one run after the disturbance occurs and a short step with duration 2 would be classified once the short-step finished, i.e., 3 runs after the disturbance occurs.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer-implemented method, comprising:
   determining a pattern based on a plurality of probabilities associated with a corresponding plurality of wafer processing parameters, the plurality of wafer processing parameters being determined by at least one measurement device following processing by at least one processing tool;
   determining a type of a disturbance based upon the pattern;
   conveying information indicative of the determined type of the disturbance;
   detecting the disturbance based upon at least one of the plurality of wafer processing parameters; and
   selecting a first plurality of processing runs in response to detecting the disturbance, the first plurality of processing runs being performed substantially before the disturbance occurred.

2. The method of claim 1, further comprising selecting a second plurality of processing runs in response to detecting the disturbance, the second plurality of processing runs being performed approximately at the same time or substantially after the disturbance occurred.

3. The method of claim 2, further comprising determining the plurality of probabilities based on the first and second pluralities of processing runs.

4. The method of claim 3, wherein determining the plurality of probabilities based on the first and second plurality of processing runs comprises determining the plurality of probabilities based on at least one wafer processing parameter associated with at least one wafer processed during each of the second plurality of processing runs.

5. The method of claim 4, wherein determining the plurality of probabilities comprises determining a probability that said at least one wafer processing parameter is indicative of the type of the disturbance.

6. The method of claim 1, wherein determining the type of the disturbance comprises comparing the pattern to at least one predetermined pattern associated with at least one type of disturbance.

7. A computer-implemented method, comprising:
  determining a pattern based on a plurality of probabilities associated with a corresponding plurality of wafer processing parameters, the plurality of wafer processing parameters being determined by at least one measurement device following processing by at least one processing tool;
  determining a type of a disturbance based upon the pattern, wherein determining the type of the disturbance comprises comparing the pattern to at least one predetermined pattern associated with at least one type of disturbance, and wherein comparing the pattern to said at least one predetermined pattern comprises comparing the pattern to at least one predetermined pattern associated with at least one of a step disturbance and an impulse disturbance;
  conveying information indicative of the determined type of the disturbance.

8. The method of claim 7, wherein comparing the pattern to said at least one predetermined pattern comprises comparing the pattern to at least one threshold associated with the at least one predetermined pattern.

9. The method of claim 7, wherein determining the type of the disturbance comprises selecting the step disturbance or the impulse disturbance based on the comparison.

10. The method of claim 9, further comprising tracking the step disturbance in response to selecting the step disturbance.

11. The method of claim 9, further comprising rejecting data associated with the impulse in response to selecting the impulse disturbance.

12. An apparatus, comprising:
  at least one processing tool for processing wafers;
  at least one measurement tool for measuring wafer processing parameters; and
  an disturbance analysis unit configured to:
    determine a pattern based on a plurality of probabilities associated with a corresponding plurality of wafer processing parameters;
    determine a type of a disturbance based upon the pattern;
    detect the disturbance based upon at least one of the plurality of wafer processing parameters; and
    select a first plurality of processing runs in response to detecting the disturbance, the first plurality of processing runs being performed substantially before the disturbance occurred.

13. The apparatus of claim 12, wherein said at least one processing tool comprises at least one of a deposition tool, an ion implantation tool, an etching tool, a polishing tool, and a masking tool.

14. The apparatus of claim 12, wherein said at least one measurement tool comprises at least one of a metrology tool and a wafer electrical test tool.

15. The apparatus of claim 12, wherein the disturbance analysis unit is configured to detect the disturbance based upon at least one of the plurality of wafer processing parameters.

16. The apparatus of claim 12, wherein the disturbance analysis unit is configured to select a second plurality of processing runs in response to detecting the disturbance, the second plurality of processing runs being performed approximately at the same time or substantially after the disturbance occurred.

17. The apparatus of claim 16, wherein the disturbance analysis unit is configured to determine the plurality of probabilities based on the first and second pluralities of processing runs.

18. The apparatus of claim 17, wherein the disturbance analysis unit is configured to determine the plurality of probabilities based on at least one wafer processing parameter associated with at least one wafer processed during each of the second plurality of processing runs.

19. The apparatus of claim 18, wherein the disturbance analysis unit is configured to determine a probability that said at least one wafer processing parameter is indicative of the type of the disturbance.

20. The apparatus of claim 12, wherein the disturbance analysis unit is configured to compare the pattern to at least one predetermined pattern associated with at least one type of disturbance.

21. An apparatus, comprising:
  at least one processing tool for processing wafers;
  at least one measurement tool for measuring wafer processing parameters; and
  an disturbance analysis unit configured to:
    determine a pattern based on a plurality of probabilities associated with a corresponding plurality of wafer processing parameters;
    determine a type of a disturbance based upon the pattern; and
    compare the pattern to at least one predetermined pattern associated with at least one of a step disturbance and an impulse disturbance.

22. The apparatus of claim 21, wherein the disturbance analysis unit is configured to compare the pattern to at least one threshold associated with the at least one predetermined pattern.

23. The apparatus of claim 21, wherein the disturbance analysis unit is configured to select the step disturbance or the impulse disturbance based on the comparison.

24. The apparatus of claim 23, wherein the disturbance analysis unit is configured to track the step disturbance in response to selecting the step disturbance.

25. The apparatus of claim 23, wherein the disturbance analysis unit is configured to reject data associated with the impulse in response to selecting the impulse disturbance.

* * * * *